US012247494B2

(12) United States Patent
Perez et al.

(10) Patent No.: US 12,247,494 B2
(45) Date of Patent: Mar. 11, 2025

(54) TURBINE ENGINE ASSEMBLY COMPRISING A CASING AND AN AERODYNAMIC TREATMENT MEMBER AT THE BLADE TIPS, AND CORRESPONDING TURBINE ENGINE

(71) Applicant: SAFRAN, Paris (FR)

(72) Inventors: Gabriel Perez, Moissy-Cramayel (FR); Mickael Vincent Philit, Moissy-Cramayel (FR); William Henri Joseph Riera, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/556,803

(22) PCT Filed: Apr. 26, 2022

(86) PCT No.: PCT/FR2022/050793
§ 371 (c)(1),
(2) Date: Oct. 23, 2023

(87) PCT Pub. No.: WO2022/229555
PCT Pub. Date: Nov. 3, 2022

(65) Prior Publication Data

US 2024/0200468 A1 Jun. 20, 2024

(30) Foreign Application Priority Data

Apr. 28, 2021 (FR) ....................................... 2104403

(51) Int. Cl.
*F01D 25/24* (2006.01)
*F01D 9/04* (2006.01)
(Continued)

(52) U.S. Cl.
CPC ............. *F01D 25/24* (2013.01); *F01D 9/041* (2013.01); *F04D 19/00* (2013.01); *F04D 29/526* (2013.01);
(Continued)

(58) Field of Classification Search
CPC .......... F01D 25/24; F01D 11/08; F01D 11/12; F01D 11/122; F04D 29/526; F04D 29/66;
(Continued)

(56) References Cited

U.S. PATENT DOCUMENTS 6,514,039 B1 * 2/2003 Hand .................... F04D 29/023 29/889.22
11,473,438 B2 * 10/2022 Reynolds .............. F04D 29/644
(Continued)

FOREIGN PATENT DOCUMENTS

EP 2434164 A1 3/2012
EP 2728196 A2 5/2014
(Continued)

OTHER PUBLICATIONS

International Search Report and Written Opinion received for PCT Patent Application No. PCT/FR2022/050793, mailed on Oct. 25, 2022, 14 pages (6 pages of English Translation and 8 pages of Original Document).

*Primary Examiner* — Elton K Wong
(74) *Attorney, Agent, or Firm* — WOMBLE BOND DICKINSON (US) LLP

(57) ABSTRACT

An assembly including a turbine engine casing, in particular for an aircraft, the turbine engine casing including an annular or cylindrical radially outer shell, provided with a radially inner surface, and an aerody-namic treatment member including a plurality of grooves distributed in a circumferential direction. The radially outer shell includes a circumferential recess in which the aerodynamic treatment
(Continued)

member is removably mounted, the treatment member extending along at least one angular sector and having a shape that matches that of the circumferential recess, the treatment member including a circumferential opening into which the plurality of grooves open.

13 Claims, 5 Drawing Sheets

(51) Int. Cl.
*F04D 19/00* (2006.01)
*F04D 29/52* (2006.01)
*F04D 29/68* (2006.01)

(52) U.S. Cl.
CPC ........ *F04D 29/685* (2013.01); *F05D 2240/11* (2013.01)

(58) Field of Classification Search
CPC ...... F04D 29/661; F04D 29/68; F04D 29/681; F04D 29/685; F04D 19/00; F05D 2240/11
See application file for complete search history.

(56) References Cited

U.S. PATENT DOCUMENTS

| | | | |
|---|---|---|---|
| 2014/0119883 | A1 | 5/2014 | Kempf |
| 2015/0078890 | A1 | 3/2015 | Obrecht et al. |
| 2015/0086344 | A1 | 3/2015 | Guemmer |
| 2021/0355844 | A1 | 11/2021 | Jarrossay et al. |

FOREIGN PATENT DOCUMENTS

| | | | |
|---|---|---|---|
| FR | 3087825 | A1 | 5/2020 |
| WO | 2013/156725 | A2 | 10/2013 |

* cited by examiner

TURBINE ENGINE ASSEMBLY COMPRISING A CASING AND AN AERODYNAMIC TREATMENT MEMBER AT THE BLADE TIPS, AND CORRESPONDING TURBINE ENGINE

FIELD OF THE INVENTION

This invention relates to the general field of the turbine engines. It applies in particular to an assembly comprising a turbine engine casing, in particular for an aircraft, and an aerodynamic treatment member mounted on the casing. The invention also concerns a turbine engine comprising such an assembly.

TECHNICAL BACKGROUND

The prior art comprises the documents EP-A2-2728196, EP-A1-2434164 and US2015/086344.

Generally speaking, an aircraft turbine engine comprises one or more turbine engine casings, each equipped with an aerodynamic treatment member. Each casing surrounds a wheel of movable blades, which are driven in rotation inside the casing. The movable blades comprise free ends which are positioned as close as possible to the inner surface of the radially outer shell of the casing. The aerodynamic treatment member comprises a plurality of grooves formed in the wall of the radially outer shell and distributed in a circumferential direction so as to optimise the aerodynamic performance of the turbine engine. The free ends of the blades face the grooves and when the blades are driven in rotation, a portion of the air flow at the level of the free ends circulates into the grooves, which reinject the air flow upstream of the blades so as to reduce the vortices generated at the free ends of the blades. These vortices formed at the tips of the blades penalise the performance of the components of the turbine engines equipped with casings surrounding movable blades. An example of an aerodynamic treatment member is described in the patent application WO-A1-2013/156725.

However, the installation of this treatment member is integrated to the casing and is complex due to the fact that the grooves are carved into the wall of the casing in a non-communicating and non-through manner, which makes it impossible to keep up with the future developments in the turbine engines. Furthermore, this treatment member integrated into the casing does not facilitate maintenance, either for the turbine engines or for the turbine engine test benches. In addition, this type of casing with integrated grooves is usually produced by machining, EDM or sinking, which limits the geometry of the grooves and their arrangement in the casings.

The invention is intended to avoid the aforementioned disadvantages.

SUMMARY OF THE INVENTION

The aim of the invention is to provide an optimum solution allowing to improve the aerodynamic efficiency of the turbine engine casings, while at the same time making them easy and economical to maintain.

This objective is achieved in accordance with the invention by means of an assembly comprising a turbine engine casing, in particular for an aircraft, the turbine engine casing comprising an annular or cylindrical radially outer shell provided with a radially inner surface, and an aerodynamic treatment member comprising a plurality of grooves distributed in a circumferential direction, the radially outer shell comprising a circumferential recess in which the aerodynamic treatment member is removably mounted, the treatment member extending along at least one angular sector and being complementary in shape to the circumferential recess, the treatment member comprising a circumferential opening into which the plurality of grooves opens.

Thus, this solution allows to achieve the above-mentioned objective. In particular, such an aerodynamic treatment member, removably mounted in the casing, allows the treatment function to be carried out thanks to the grooves it comprises and to be easily disassembled and mounted for the maintenance, here on the upstream side in the following description. In particular, the aerodynamic treatment member is in the form of a cartridge with several functions. One of the functions of the grooves is to control the circulation of the air flow to the free ends (tip ends) of the blades, so as to achieve very good aerodynamic efficiency. This also allows to reduce the air flow vortices created in the clearance or space formed between the radially outer shell of the casing and the free ends of the blades, which creates a pumping phenomenon. In addition, the fact that the grooves are integrated into a removable member means that several groove geometries can be offered, which improves the performances depending on the specific objectives of each turbine engine. Added to this is the fact that manufacturing costs are reduced and the service life of the casing is improved because it is only possible to change the aerodynamic treatment member.

The assembly comprises one or more of the following characteristics, taken alone or in combination:

- the treatment member comprises a first surface and a second surface opposite the first surface, the first surface being intended to have a surface continuity with the radially inner surface of the radially outer shell.
- the treatment member has substantially a L-shape.
- the treatment member is produced by additive manufacturing, preferably on a powder basis.
- the treatment member is made of an abradable material.
- the member is made of a metallic material, a thermoplastic material or a ceramic material.
- the second surface comprises a slot intended to face at least one portion of the radially inner surface of the treatment member, the slot forming a radial space between the bottom of the slot and the radially inner surface portion.
- each groove has an elongated shape along a main direction of orientation with a substantially straight first portion and a second portion substantially inclined with respect to the first portion.
- the assembly comprises a wheel with blades surrounded by the casing, the aerodynamic treatment member being arranged facing the free ends of the blades so that when the blades rotate, a flow of air circulating at the level of the free ends penetrates the grooves and possibly the circumferential opening.
- the casing is a high-pressure or low-pressure compressor casing.
- the treatment member is made up of several treatment member sectors.
- the treatment member is annular.

The invention relates to an assembly comprising a turbine engine casing, in particular for an aircraft, the turbine engine casing comprising an annular or cylindrical radially outer shell provided with a radially inner surface, and an aerodynamic treatment member comprising a plurality of grooves distributed in a circumferential direction, the radially outer shell comprising a circumferential recess in which the aerodynamic treatment member is removably mounted, the treatment member extending along at least one angular sector and being complementary in shape to the circumferential recess, the treatment member being substantially L-shaped.

According to one characteristic of this assembly, the member is mounted upstream of the casing.

According to another characteristic of this assembly, the aerodynamic treatment member is arranged opposite the free ends of the blades so that when the blades rotate, a flow of air circulating at the level of the free ends enters the grooves.

The invention also relates to a turbine engine comprising an assembly having any of the above characteristics.

The invention further relates to an aircraft comprising at least one turbine engine as above-mentioned.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
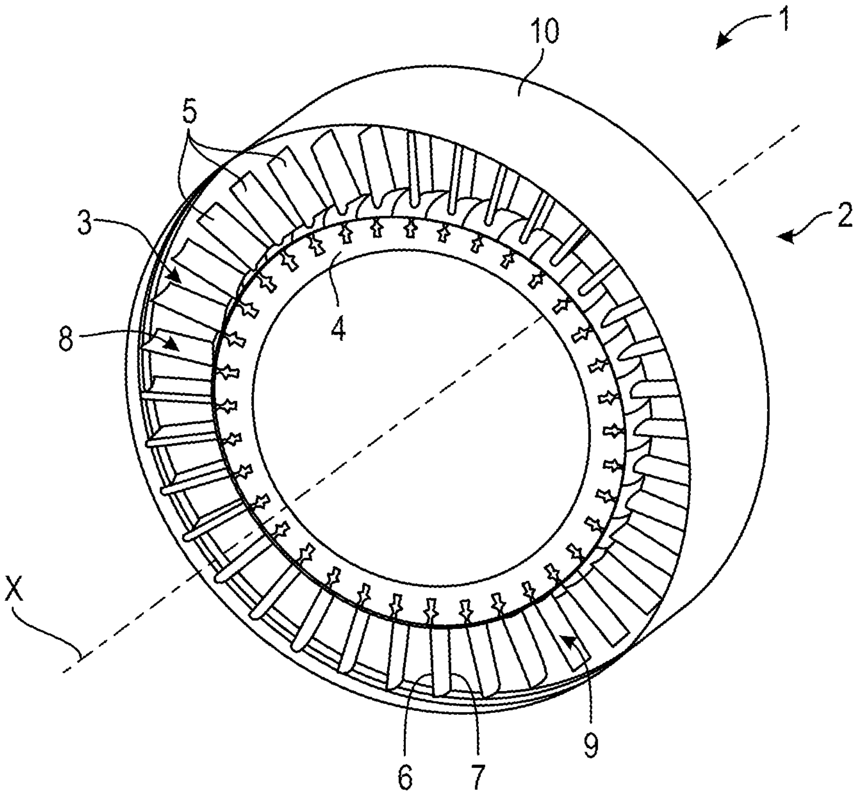
FIG. 1 shows a perspective view of a turbine engine assembly comprising a turbine engine casing surrounding movable blades and an aerodynamic treatment member facing the free ends of the blades in accordance with the invention.

FIG. 1 illustrates an assembly intended to equip a turbine engine 1, in particular an aircraft turbine engine. The turbine engine may be a turbojet or a turboprop. The assembly comprises a turbine engine casing and an aerodynamic treatment member intended to equip the turbine engine casing.

In the present application, the terms "upstream", "downstream", "axial" and "axially" are defined with respect to the circulation direction of the gases in the turbine engine and also along the longitudinal axis X (and even from left to right in FIG. 1). The terms "radial," "radially", "inner", and "outer" are also defined with respect to a radial axis Z that is perpendicular to the axis X of the turbine engine.

Generally speaking, a turbine engine, in particular for an aircraft, with a longitudinal axis X, comprises a gas generator (not shown) which comprises, from upstream to downstream and in the direction of flow of the gas or air flows, a compressor section, a combustion chamber and a turbine section. The compressor section may comprise a low-pressure compressor and a high-pressure compressor. The turbine section may comprise a low-pressure turbine and a high-pressure turbine. Intermediate casings can be fitted between low-pressure and high-pressure compressor casings and also between low-pressure and high-pressure turbine casings. Downstream of the low-pressure turbine is an exhaust casing for the evacuation of the primary flow passing through the gas generator. Each compressor (low or high pressure) and each turbine (low or high pressure) respectively comprises a number of movable blade wheels which are mounted upstream or downstream of stationary wheels or stator. The movable blade wheels are surrounded by compressor casings or turbine casings.

The double flow and double body turbine engines each comprise a fan (not shown) mounted upstream of the gas generator. The fan comprises a plurality of movable fan blades which are driven in rotation about the longitudinal axis by a drive shaft such as a low-pressure compressor shaft. The fan blades are surrounded by a fan casing carrying a nacelle. The latter is attached to a wing of an aircraft.

The casing shown in FIG. 1 is a compressor casing 2, in particular a low-pressure or high-pressure casing surrounding movable blades 3. However, the casing may be a turbine casing or a fan casing. The movable blades 3 extend radially from the periphery of a disc 4 on which they are mounted. The blades 3 each comprise a free end 5 facing the casing. The movable blades 3 also each comprise a leading edge 6 and a trailing edge 7 opposite each other substantially along the longitudinal axis X. These leading and trailing edges connect an intrados surface 8 and an extrados surface 9.

Figure 2:
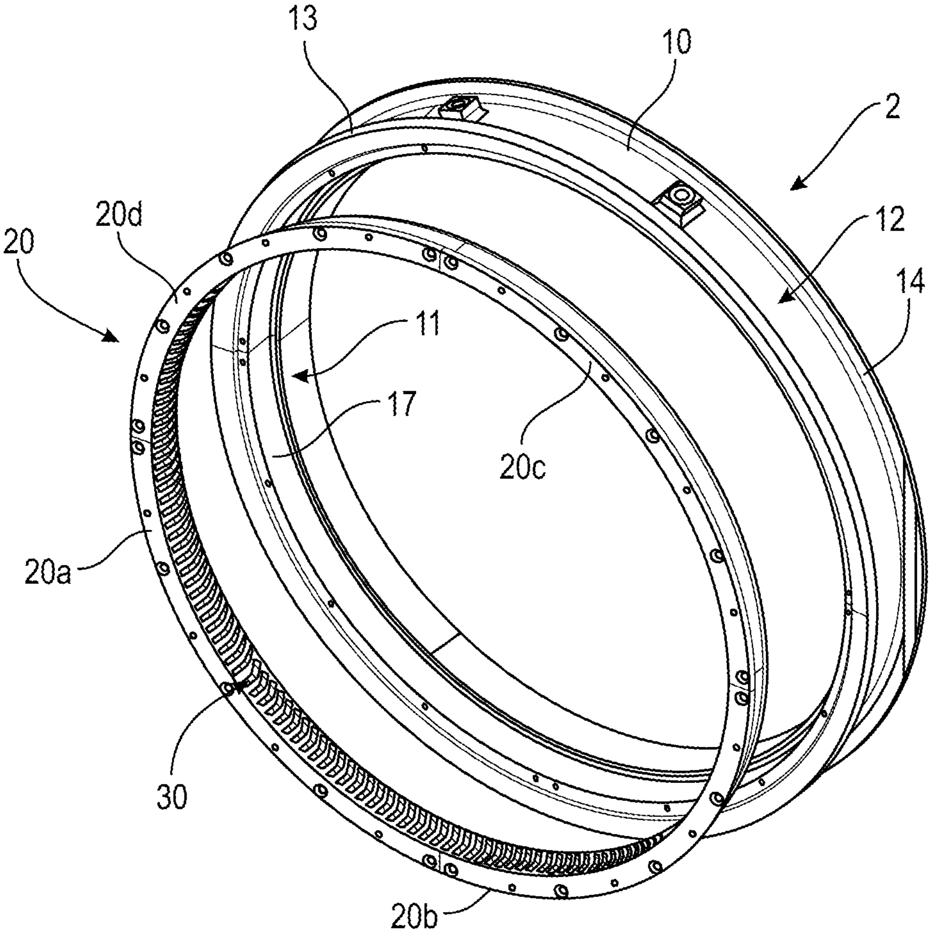
FIG. 2 is a perspective view of a removable treatment member intended to be mounted on a turbine engine casing according to the invention.
Figure 3:
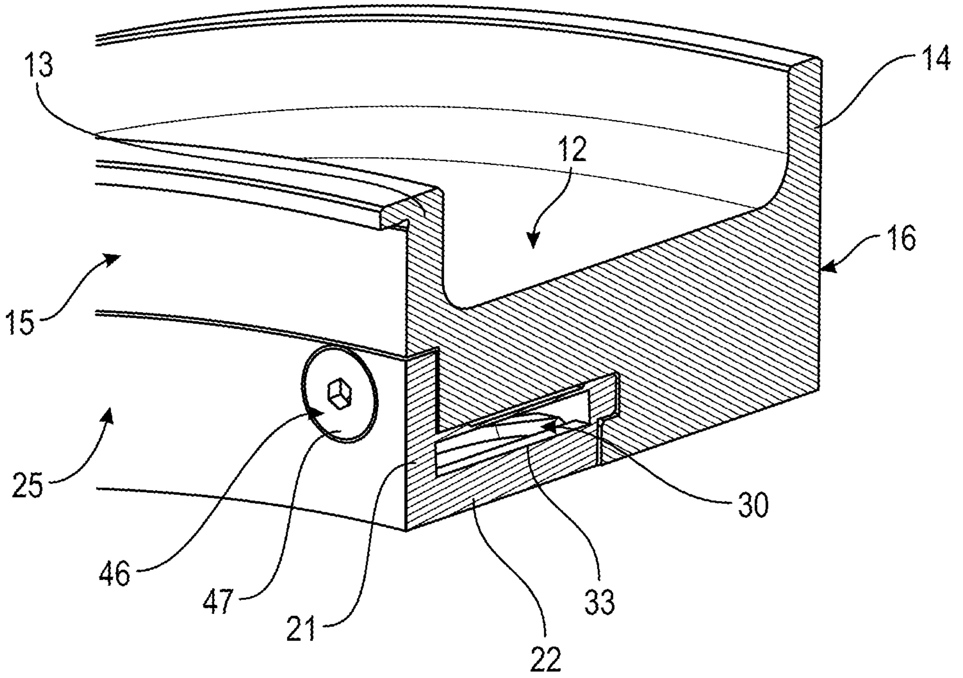
FIG. 3 shows a front partial perspective view of the upstream side of an example of an aerodynamic treatment member mounted and attached to a turbine engine casing according to the invention.

With reference to FIGS. 2 and 3, the casing 2 comprises an annular or cylindrical radially outer shell 10 which is centred on the longitudinal axis X. The radially outer shell 10 has a radially inner surface 11 and a radially outer surface 12 which are radially opposite. The radially inner surface 11 faces the free ends 5 of the movable blades 3. A clearance is provided between the free ends 5 of the blades 3 and the radially inner surface 11 so as to allow a flow of air to circulate. The casing 2 comprises an upstream flange 13 and a downstream flange 14, each extending outwards from the radially outer surface 12 of the radially outer shell 10. The upstream and downstream flanges 13, 14 allow the casing 2 to be attached to adjacent components of the turbine engine, such as casings or a stationary structure. In particular, the radially outer shell 10 comprises an upstream face 15 and a downstream face 16 which are opposite each other along the longitudinal axis. The downstream face 16 has a continuous surface with that of the downstream flange 14. The upstream face 15 also has a continuous surface with that of the upstream flange 13.

The aerodynamic treatment member 20 is removably mounted on the radially outer shell 10 of the casing 2. To achieve this, the radially outer shell 10 comprises a circumferential recess 17, as shown in FIG. 2, which is formed in the radially inner surface 11. The circumferential recess 17 extends in a circumferential direction around the longitudinal axis X. The circumferential recess 17 opens into both the radially inner surface 11 and the upstream face 15 of the radially outer shell 10. Even more specifically, the circumferential recess 17 is substantially L-shaped and open on the upstream and downstream sides.

Figure 4:
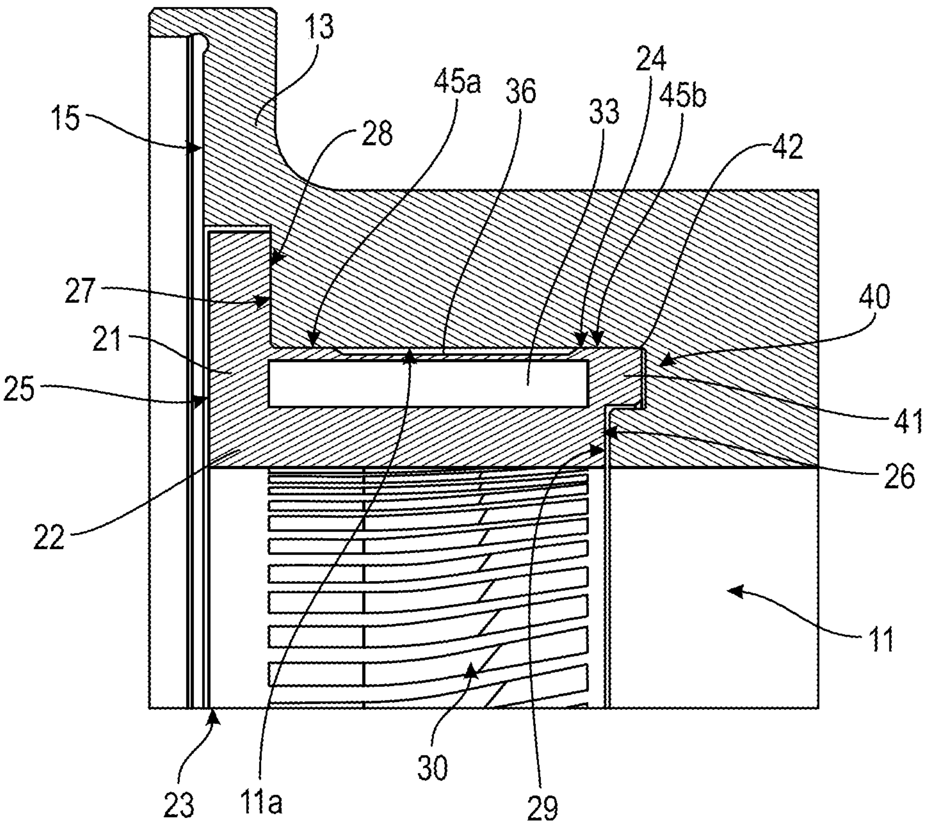
FIG. 4 shows a partial radial cross-section perspective view of an example of a treatment member mounted and attached to a turbine engine casing using attachment components in accordance with the invention.

As shown in FIGS. 3 and 4, the treatment member 20 has a L-shape in radial section. This has a radial branch on the upstream side and an axial branch which extends towards the downstream side and the inner side of the casing 2 when installed. The treatment member 20 is complementary in shape to the circumferential recess 17 in which it is removably mounted, and on the upstream side. More specifically, the treatment member 20 comprises a radial wall 21 and an axial wall 22. The treatment member 20 has a first surface 23 and a second surface 24 which are radially opposite each other. The first and second surfaces 23, 24 are carried by the axial wall 22. The treatment member 20 also comprises a first flank 25 and a second flank 26 which are axially opposite each other. The first flank 25 is carried by the radial wall 21, while the second flank 26 is carried by the axial wall 22.

In order to limit or even avoid disturbing the flowing of the air flow inside the casing 2, the treatment member 20 is mounted in the circumferential recess 17 so that the first surface 23 of the treatment member 20 has a surface continuity with the radially inner surface 11 of the radially outer shell 10. Similarly, the first flank 25 of the treatment member 20 has a surface continuity with the upstream face 15 of the radially outer shell 10.

The circumferential recess 17 defines a first support surface 27 which is axially offset from the upstream face 15 of the radially outer shell 10. The first support surface 27 is defined in a plane perpendicular to the longitudinal axis X. The treatment member 20 has a second support surface 28 which is intended to bear on the first support surface 27. The second support surface 28 is supported by the radial wall 21 and is axially opposite the first flank 25. In this way, the radial wall 21 comprises a thickness (along the longitudinal axis) which is equal to or substantially equal to the distance between the upstream face 15 and the first support surface 27 of the radially outer shell. The circumferential recess 17 also defines a third support surface 29 which is axially offset from and downstream of the first support surface 27. The third support surface 27 is also defined in a plane perpendicular to the longitudinal axis. The second flank 26 is designed to bear on the third support surface 27 of the treatment member 20. The second flank 26 comprises a flat surface defined in a plane perpendicular to the longitudinal axis. The support/plane connections formed by the support surfaces 27, 28, 29 and the second flank 26 allow to limit or even prevent the axial displacement of the treatment member 20 relative to the casing 2.

Figure 7:
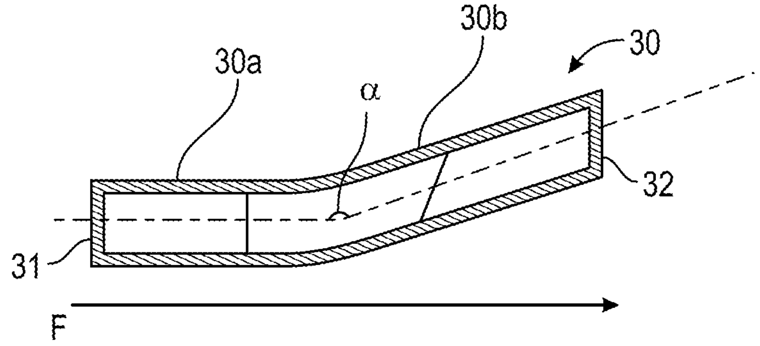
FIG. 7 schematically illustrates a shape of an example groove of a treatment member according to the invention.
Figure 8:
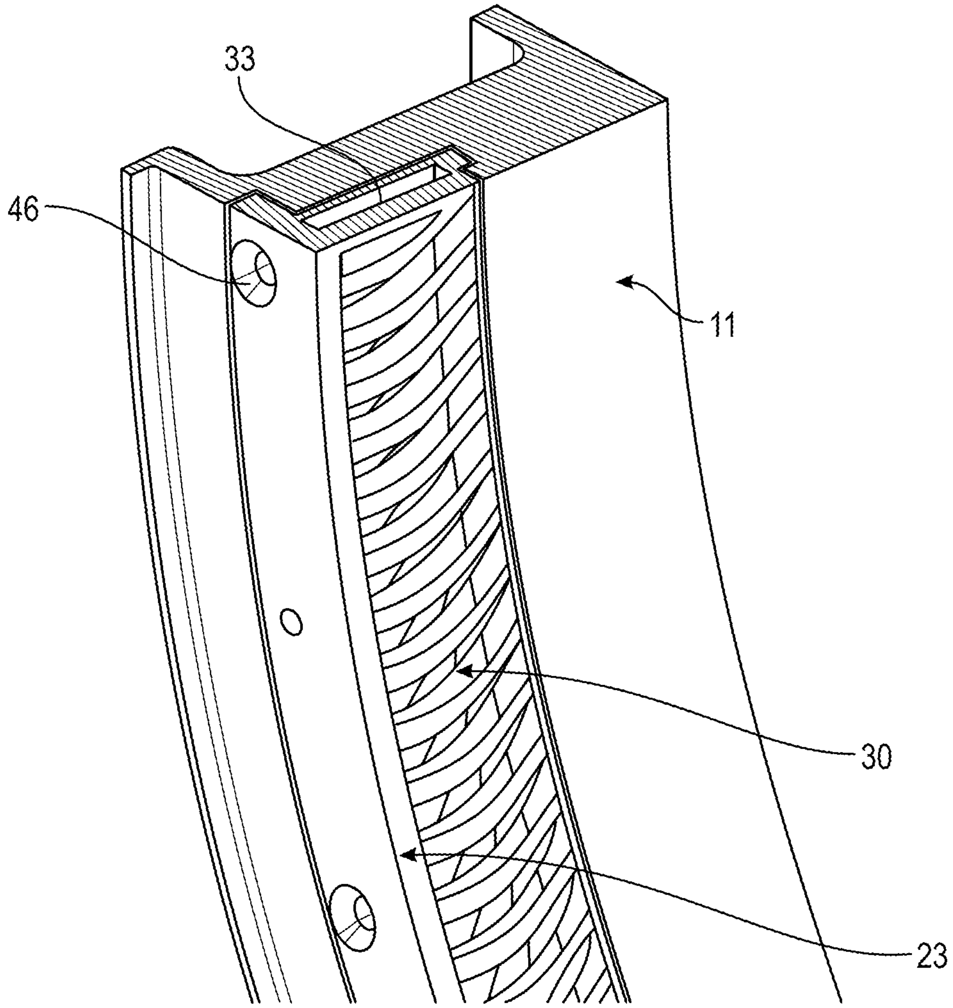
FIG. 8 is a bottom and downstream side view of an example of an aerodynamic treatment member mounted on a turbine engine casing according to the invention.

With reference to FIGS. 4 to 8, the aerodynamic treatment member 20 comprises a plurality of grooves 30 distributed in the circumferential direction. The grooves 30 pass through a wall of the treatment member 20 on either side along the radial axis. In particular, the grooves 30 are formed in the axial wall 22. These are parallel to each other and do not communicate laterally (circumferentially) with each other. Each groove 30 has an elongated shape in a main direction of orientation. FIG. 7 shows an example of a groove 30. According to this example, each groove 30 comprises a first portion 30*a* which is substantially straight and a second portion 30*b* which is substantially inclined with respect to the first portion 30*a*. The angle of inclination a (alpha) between the first portion and the second portion is between 110° and 150°. The main orientation direction is substantially inclined with respect to the longitudinal axis. Of course, the grooves can have different and complex shapes. These can be rectangular in cross-section, half-moon-shaped, with a continuous inflection or curvature. These can also be non-axial.

In the example shown, each groove 30 comprises an upstream end 31 and a downstream end 32 opposite each other in the main direction of orientation. The free ends of the blades 30 extend axially between the upstream end 31 and the downstream end 32 of the grooves. In other words, the length of each groove 30 is greater than the length of the free ends of the blades. More precisely still, by way of example, the leading edge 6 of the blades 3, at the level of the free ends 5, is axially offset and is located downstream of the upstream end of the grooves 30.

The aerodynamic treatment member 20 also comprises a circumferential opening 33. The circumferential opening 33 extends radially outside the grooves (when installed). All the grooves 30 open into the circumferential opening 33. This allows the air flow to circulate through the grooves and into the circumferential opening. The opening 33 also extends axially along a length substantially equal to the length of the grooves 30.

If the treatment member 20 does not have a circumferential opening, the grooves comprise a bottom (blind grooves) so that they do not open out.

Figure 5:
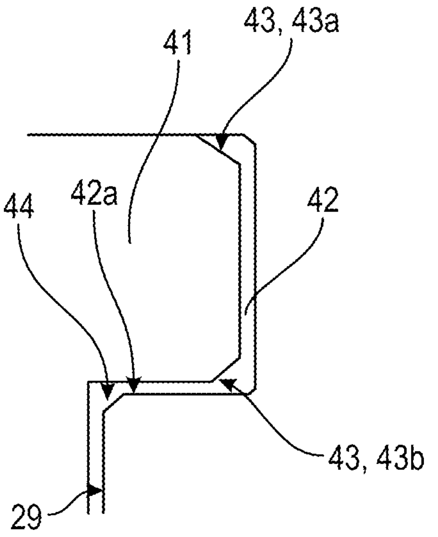
FIG. 5 is a radial cross-sectional view of the centring means of an example of a treatment member mounted on a turbine engine casing according to the invention.
Figure 6:
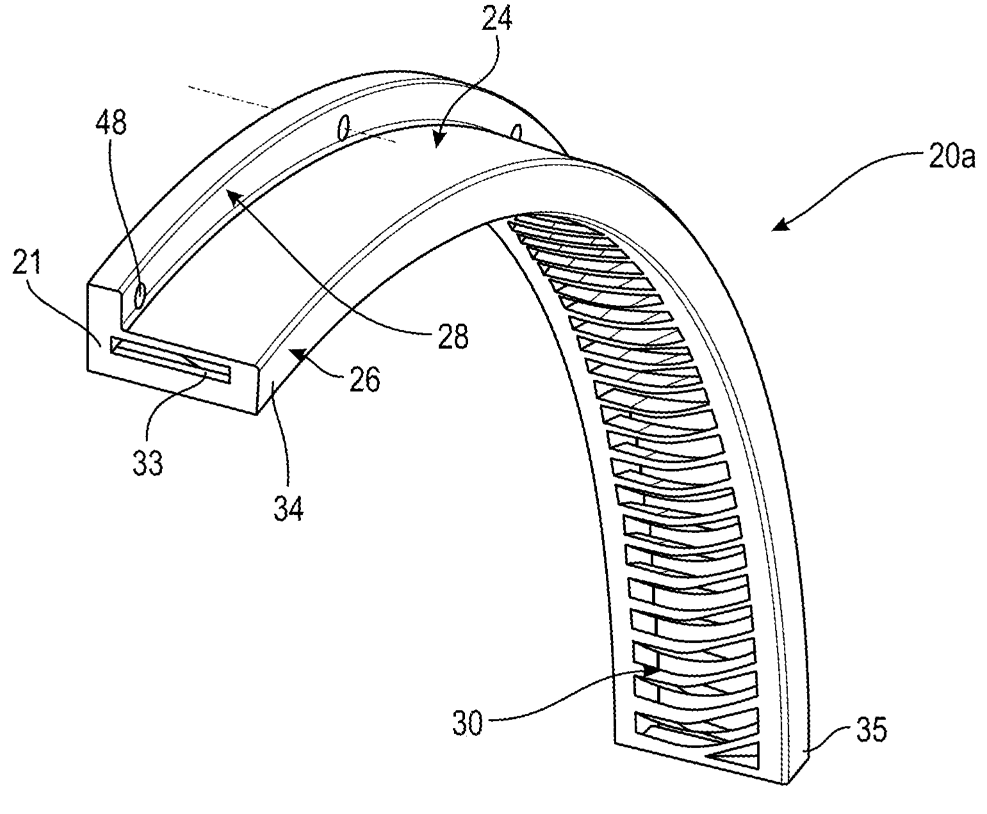
FIG. 6 is a top view, in perspective and on the downstream side, of an example of an aerodynamic treatment member according to the invention.

The aerodynamic treatment member 20 shown in FIG. 5 extends along at least one angular sector. In this example, as shown in FIG. 1, the treatment member 20 is made up of several treatment member sectors 20*a*, 20*b*, 20*c* and 20*d*. The sectors 20*a*, 20*b*, 20*c* and 20*d* are identical and are arranged around the longitudinal axis. Each angular sector extends, in the circumferential direction, between a first circumferential end 34 and a second circumferential end 35 (see FIG. 6). The circumferential ends 34, 35 are intended to be in contact with circumferential ends of the adjacent treatment member sectors. The contact between the circumferential ends is advantageously a flat contact. To this end, the treatment member sectors comprise flat surfaces defined in a radial plane at each first and second circumferential end. Each sector extends over an angular sector of between 80 and 100°. Preferably, the angular sector is 90°. Here, four treatment member sectors 20*a*, 20*b*, 20*c*, 20*d* are mounted on the radially outer shell to form an annular shape (360°).

Alternatively, the treatment member 20 is annular and formed in one piece. The annular treatment member 20 is also substantially L-shaped and complements the shape of the circumferential recess 17. In this case, a single treatment member is required to fill up the circumferential recess 17 along its entire circumferential length.

In the case of the aerodynamic treatment member formed by several sectors, the circumferential opening 33 opens circumferentially into the flat surfaces of the circumferential ends 34, 35 of the sectors. In the case of the treatment member formed in one piece, the circumferential opening is annular (360°).

Advantageously, the treatment member is produced by additive manufacturing or selective powder fusion. The additive manufacturing allows to produce complex geometries and parts made from different materials (in a single piece). Preferably, but not exclusively, the additive manufacturing is a laser fusion method on a powder bed known by the acronym SLM for "Selective Laser Melting". The method is carried out using an installation in which several layers of material, in particular in powder form, are superimposed on a production support. The layers of powder from a supply tank are transferred to the production support and then fused one after the other by means of a laser beam 70 moving over the surface of each layer. With the additive manufacturing method, the treatment member can be made in several sectors or in a single piece. The aerodynamic treatment member in a single piece allows to limit or prevent leaks that could occur between the treatment member sectors.

The treatment member 30 is made of a metallic material. Examples of metallic materials are stainless steel, titanium, an alloy of iron and nickel, etc. Advantageously, the metal material of the treatment member is identical to that of the turbine engine casing. Alternatively, the treatment member 20 is made of a thermoplastic material. An example of a thermoplastic material is a Polyetheretherketone (Peek) or a Polyetherimide (PEI). The treatment member could also be made of a composite material to reduce the weight of the treatment member 30. A composite material treatment member 30 allows to ensure a less impact if a free end of a movable blade comes into contact with it. The choice of materials will have to take into account the problems of surface state, resistance to temperature and dirt. The thermoplastic and ceramic materials also allow to help to reduce the weight and the replacement costs of the parts. Another advantageous characteristic is that the treatment member material has a higher coefficient of expansion than the casing. The difference in the coefficient of expansion means that there is a downward step between the treatment member and the casing, so that the flow is disrupted as little as possible.

Alternatively, the treatment member is made from an abradable material, such as a conventional metal.

As can be seen in FIG. 4, the treatment member 20 comprises a slot 36 which is defined in the second surface 24 thereof. The slot 36 extends in the circumferential direction over the entire surface of each sector or is annular (360°). The slot 36 has a substantially U-shaped or frustoconical radial cross-section and opens into the second surface 24. The slot 36 is intended to face a radially inner surface portion of the radially outer shell. This configuration allows a radial space to be formed between the bottom of the slot 36 and the radially inner surface portion 11*a* of the radially outer shell 10 and allows the expansion of the material of the treatment member.

With reference to FIGS. 4 and 5, the treatment member 20 also comprises means 40 for centring it on the casing. The centring means 40 comprise an annular leg 41 designed to engage in a notch 42 of the turbine engine casing. The shape of the leg 41 complements that of the notch 42. The annular leg 41 extends precisely from the second flank 26 along the longitudinal axis.

In FIG. 5, the annular leg comprises chamfers 43 to make it easier to mount the treatment member on the casing 2. The chamfers 43 extend along the entire circumferential length of the leg 41. A first chamfer 43*a* extends between the second flank 26 and the second surface 24 and a second chamfer 43*b* also extends between the second flank 26 and the first surface 23. Advantageously, the chamfers 43 have a surface that is inclined relative to the plane of the second flank 26. The surface of the chamfers 43 is substantially flat. The radially outer shell 10 also comprises a chamfer 44 which is located between the support surface 29 and a substantially annular lateral wall 42*a* of the notch 42. The chamfer 44 also extends along the entire circumferential length of the support surface 29.

The centring means 40 also comprise at least one annular support surface intended to bear against the portion 11*a* of the radially inner surface 11 of the radially outer shell 10. The support surface is also complementary in shape to the radially inner surface portion 11*a*. This support surface forms a "long" support and avoids a hyperstatism. More specifically, the treatment member 20 is provided with two annular support surfaces 45*a*, 45*b*. These annular support surfaces are located on either side of the slot 36 and bear against the radially inner surface portion 11*a*.

In FIGS. 1 and 7, the treatment member 20 is attached to the casing 2 using attachment components 46 such as screws 47 (with countersunk heads, for example). The treatment member 20 comprises first holes 48 which are formed in the radial wall 21 and pass through the latter on both sides. Each first hole 48 has a substantially parallel longitudinal axis. The first holes 48 open onto the support surface 28. The casing 2 also comprises second holes (not shown) which are formed in the radially outer shell 10 and whose axes are parallel to the longitudinal axis. The first and second holes are coaxial and have screws passing through them to hold the treatment member 10 in position on the casing 2. These attachment components 46 ensure a maximum radial compactness.

We will now describe a method for mounting the treatment member 20 on a turbine engine casing. The method comprises a step of providing a treatment member 20 comprising grooves 30. The treatment member 20 is provided in the form of several sectors or as a single annular piece. The method comprises a step of positioning the treatment member 20 upstream of the casing 2 and in the correspondingly shaped circumferential recess 17. To fit the treatment member 20 to the casing, the annular leg 41 of the treatment member 20 is inserted into the notch 42 in the turbine engine casing 2. The chamfers 43, 43*a*, 43*b* and 44 allow the different parts to slide together. The support surfaces and second flank also bear against each other to hold the treatment member 20 to the casing 2. Then, or simultaneously, the radial branch 21 is installed in the portion of the corresponding circumferential recess 17 upstream of the casing. The second surface or at least part of it (surfaces 45*a*, 45*b*) comes into contact with the radially inner surface portion 11 of the casing 2, and a second support surface 28 also comes into contact against the first support surface 27. Next, the method comprises a step of attaching the treatment member 20 to the casing 2. During this step, a number of screws are inserted into the corresponding first and second holes so as to secure the treatment member 20 to the casing. The treatment member is dismantled by carrying out the steps in reverse. During operation and when the blades 3 are rotating, the flow of air circulating at the level of the free ends 5 of the blades enters the grooves 30. If the treatment member has a circumferential opening, the air flow circulates through the grooves 30 and the circumferential opening 33.

The invention claimed is:

1. An assembly comprising a casing for a turbine engine, the turbine engine casing comprising an annular or cylindrical radially outer shell provided with a radially inner surface, and an aerodynamic treatment member comprising a plurality of grooves distributed in a circumferential direction, wherein the radially outer shell comprises a circumferential recess in which the aerodynamic treatment member is removably mounted, the treatment member extending along at least one angular sector and being complementary in shape to the circumferential recess, the treatment member comprising a circumferential opening into which the plurality of grooves opens.

2. The assembly according to claim 1, wherein the treatment member comprises a first surface and a second surface opposite the first surface, the first surface being intended to have a surface continuity with the radially inner surface of the radially outer shell.

3. The assembly according to claim 2, wherein the second surface comprises a slot intended to face at least one portion of the radially inner surface, the slot forming a radial space between the bottom of the slot and the radially inner surface portion.

4. The assembly according to claim 1, wherein the treatment member has a L-shape.

5. The assembly according to claim 1, wherein the treatment member is produced by additive manufacturing.

6. The assembly according to claim 5, wherein said additive manufacturing is on a powder basis.

7. The assembly according to claim 1, wherein the treatment member is made of an abradable material.

8. The assembly according to claim 1, wherein the member is made of a metallic material or of a thermoplastic material or of a ceramic material.

9. The assembly according to claim 1, wherein each groove has an elongate shape in a main direction of orientation with a straight first portion and a second portion substantially inclined with respect to the first portion.

10. The assembly according to claim 1, wherein the assemblies comprises a wheel with blades surrounded by the casing, the aerodynamic treatment member being arranged facing free ends of the blades so that, when the blades rotate, a flow of air circulating at the level of the free ends penetrates at least into the grooves.

11. The assembly according to claim 1, wherein the casing is a high-pressure or low-pressure compressor casing.

12. The assembly according to claim 1, wherein the treatment member is formed of several treatment member sectors or is annular.

13. A turbine engine, comprising an assembly according to claim 1.

* * * * *